United States Patent [19]

Jenkins

[11] 4,425,394

[45] Jan. 10, 1984

[54] WEB OF TAGS AND METHOD OF ATTACHING TAGS

[75] Inventor: William A. Jenkins, Dayton, Ohio

[73] Assignee: Monarch Marking Systems, Inc., Dayton, Ohio

[21] Appl. No.: 390,166

[22] Filed: Jun. 21, 1982

[51] Int. Cl.$^3$ .......................... B32B 3/16; B32B 3/24

[52] U.S. Cl. .................................... 428/136; 40/2 R; 283/81; 29/433; 428/220

[58] Field of Search .................................. 428/40–42, 428/136, 137, 220; 283/21; 40/2 R

[56] References Cited

U.S. PATENT DOCUMENTS

| | | | |
|---|---|---|---|
| 3,650,452 | 3/1972 | Finke | 227/67 |
| 4,081,309 | 3/1978 | Jenkins | 428/42 X |
| 4,260,656 | 4/1981 | Mullen | 428/42 |
| 4,335,172 | 6/1982 | Sato | 428/136 X |

*Primary Examiner*—Alexander S. Thomas

*Attorney, Agent, or Firm*—Joseph J. Grass

[57] ABSTRACT

There is disclosed a web of tags adapted to be attached to merchandise either by a conventional hand-held tag attacher which dispenses a fastener through a hollow attacher needle or by a loop-type fastener. The tag is convenient to use because its chadless hole pattern enables the tag to be held on the attacher needle without falling off before the needle is inserted into the merchandise to be tagged. In one illustrated embodiment, the chadless hole pattern will also open to a greater extent to enable passage of the head of a loop-type fastener.

3 Claims, 9 Drawing Figures

WEB OF TAGS AND METHOD OF ATTACHING TAGS

BACKGROUND OF THE INVENTION

1. Field of the Invention

This invention relates to the art of a web of tags adapted to be attached to merchandise and to method of attaching tags to merchandise.

2. Brief Description of the Prior Art

U.S. Pat. No. 3,650,452 disclosed a hand-held tag attacher for attaching a tag to merchandise. Typically the needle of the attacher is passed through a hole in the tag that is larger than the outside dimensions of the needle. The tag is apt to fall off the needle before the tip of the needle penetrates the merchandise because of the size of the attacher hole. It has also been known to provide an essentially round chadless attacher hole in which the flap portion formed by the incomplete circular cut remains hingedly attached to the remainder of the tag.

SUMMARY OF THE INVENTION

The invention relates to a low-cost web of tags useful for attachment to merchandise. The web is composed of single-ply, printable, paper-like material of the type of which price tags are typically made. The web is partially severed at longitudinal spaced intervals to provide a series of separable tags. Each tag has a chadless hole provided by a pattern of knife cuts. A preferred embodiment has a pair of spaced relatively long cut portions and a relatively short cut portion joined to the long cut portions to provide an elongated first flap portion having relatively long sides and a relatively short end, together with additional cuts, defining a second flap portion, joined to the cut pattern enabling ready insertion of a head of a loop-type fastener. The long cut portions are relatively close to each other and specifically are more narrowly spaced than the width of the tag attacher needle. On the other hand, the distance between the short cut portion and the hinge portion which connects the first flap portion to the remainder of the tag is greater than the width of the tag attacher needle. Thus, the sides of the hole provided by the long cuts grip the needle but deflect readily because the hole is elongated. In the event the tag is to be attached to an article by means of a loop-type fastener the first and second flap portions are both deflected to allow passage of the head of the loop-type fastener.

In an alternative embodiment the additional cuts forming the second flap portion are eliminated. This alternative embodiment is useful where there is no need for attaching the tag with a loop-type fastener.

DETAILED DESCRIPTION OF THE PREFERRED EMBODIMENTS

Figure 1:
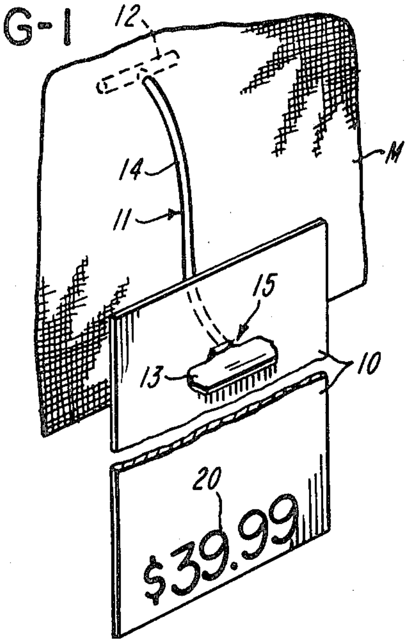
FIG. 1 is a perspective view of a partly broken-away tag according to one embodiment of the invention the tag being attached to merchandise by a plastic fastener of the type having a bar and a head joined by a filament.

With reference to FIG. 1, there is shown a tag 10 attached to merchandise M by a one-piece plastic fastener 11 having a bar 12 and a head or button 13 joined by a filament 14. The filament 14 is shown to pass through a chadless hole generally indicated at 15. The fastener 11 can be applied by a hand-held tag attacher as shown in U.S. Pat. No. 3,650,452.

Figure 2:
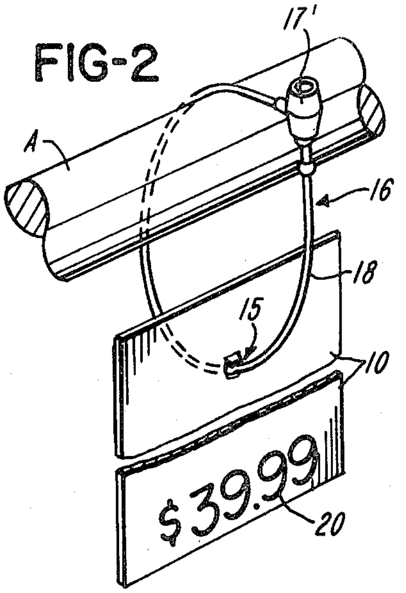
FIG. 2 is a perspective view of one embodiment of a tag shown attached to an article by a loop-type fastener.
Figure 7:
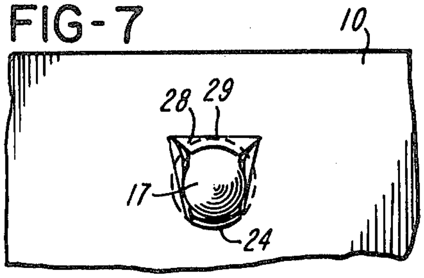
FIG. 7 is an elevational fragmentary view from the left side of FIG. 6.

FIGS. 2 and 7 taken together show a loop-type fastener 16 having a head 17 and a socket 17' for receiving the head 17 joined by a filament 18. The fastener 16 is shown in FIG. 2 to be looped about an article or member A.

Figure 3:
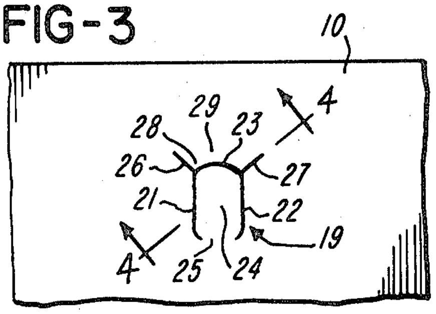
FIG. 3 is an enlarged fragmentary elevational view of a tag of the one embodiment showing a chadless hole cut configuration for receiving either the bar and the filament of the type of fastener shown in FIG. 1 or the loop-type fastener shown in FIG. 2.

A preferred chadless hold knife cut pattern or configuration generally indicated at 19 for the tag 10 is illustrated in FIG. 3. The hole 15 formed by the knife cut pattern 19 is characterized as being chadless because the tag stock is knife cut without removing any of the tag material. When tag material is removed as by punching a hole in a tag, the resulting removed material is known in the art as chad. The material of which the tag 10 is preferably composed for price marking purposes is single-ply, printable, paper-like material. As can be seen in FIGS. 1 and 2, the tag 10 is suitably imprinted with a price 20 and/or other information. The cut configuration 19 is shown to have a pair of long cut portions 21 and 22 and a relaatively short cut portion 23 joined to the one ends of the long cut portions. The cut portions 21, 22 and 23 together provide a generally U-shaped knife cut providing a flap portion 24. The flap portion 24 remains joined to the remainder of the tap 10 at a hinge portion 25.

Figure 5:
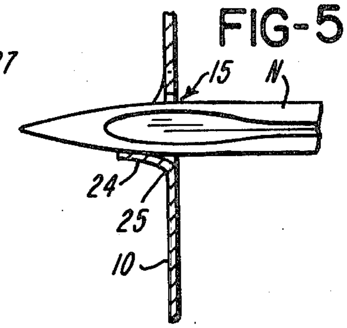
FIG. 5 is a partly sectional fragmentary view showing a needle of a hand-held tag attacher penetrating the chadless hole in the tag.

A pair of converging knife cut portions 26 and 27 are shown to join the U-shaped knife cut where the short knife-cut portion 23 joins the long knife-cut portions 21 and 22. The cut portion 23 and the cut portions 26 and 27 provide another flap portion 28. The flap portion 28 remains joined to the remainder of the tag 10 at a hinge portion 29. Thus, the cut portion 23 is common to both flap portions 24 and 28. The flap portion 24 is deflected as the needle N of the hand-held tag attacher is inserted into the hole 15 as shown in FIG. 5, however the needle N does not necessarily deflect the flap portion 28. The outside dimension of the tag-piercing portion of the needle N is wider than the distance between cut portions 21 and 22 so the elongated sides of the tap 10 at the cut portions 21 and 22 deform slightly and frictionally grip the needle N. Thus, when the needle N is inserted into the hole 15, the tag 10 grips the needle sufficiently to prevent the tag 10 from falling off the needle N. The distance between the hinge portion 25 and the cut portion 23 is greater than the outside dimension of the tag-piercing portion of the needle N. Thus, the needle N is not required to simultaneously enlarge the entire hole 15, just the opposed sides provided by cut portions 21 and 22.

Figure 6:
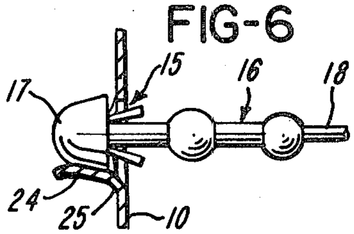
FIG. 6 is a partly sectional fragmentary view of a tag showing the loop-type fastener penetrating the chadless hole.

When the head 17 of the loop fastener 16 is inserted into the hole 15, it deflects both flap portions 24 and 28 as shown in FIGS. 6 and 7.

Figure 4:
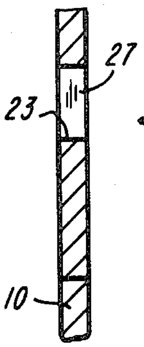
FIG. 4 is an enlarged sectional view taken along line 4—4 of FIG. 3.

As can be seen especially from FIGS. 3, 4 and 5, the cut portions 21, 22, 23, 26 and 27 extend completely through the tag 10.

Figure 8:
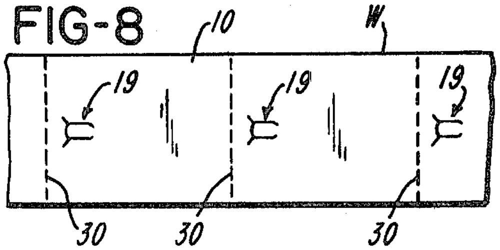
FIG. 8 is a fragmentary strip of the tags shown in FIGS. 1 through 7.

With reference to FIG. 8, there is shown a web W of tags 10 having the cut configurations 19. The tags 10 are provided in a continuous strip of the tag material by longitudinally spaced lines of partial severing 30.

Figure 9:
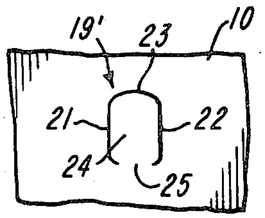
FIG. 9 is a fragmentary elevational view of a tag with an alternative form of chadless hole.

The embodiment of the tag 10 shown in FIG. 9 is identical to the embodiment of FIGS. 1 and 8, except that the tag 10 of FIG. 9 is provided with a chadless hole cut configuration 19' which omits cut portions 26 and 27. Thus, the same reference characters are used to designate like cut portions and the like flap portion 24.

By way of example, not limitation, the distance between the cut portions 21 and 22 is about 1.57 millimeters, and the distance between the hinge portion 25 and the cut portion 23 is about 2.36 millimeters. The needle N has approximate dimensions of between about 1.65 millimeters and about 1.9 millimeters.

Other embodiments and modifications of the invention will suggest themselves to those skilled in the art, and all such of these as come within the spirit of this invention are included within its scope as best defined by the appended claims.

I claim:

1. A web of tags composed of single-ply, printable, paper-like material, the tag including a chadless hole knife-cut pattern having a pair of long cut portions and a relatively short cut portion joined to the long cut portions in a generally U-shaped arrangement to provide an elongated flap portion having relatively long sides and a relatively short end, the flap portion being hingedly joined to the remainder of the tag by an uncut portion opposite the short end, the flap portion being deflectable about the hinge portion by a tag attacher needle which is wider than the distance between the long cut portions but which is narrower than the distance between the short cut portion and the hinge portion, additional cuts defining an additional flap portion joined to the cut pattern enabling ready insertion of a head of a loop-type fastener, and wherein the short end portion forms adjacent edges of the flap portions.

2. A web of tags as defined in claim 1, wherein the distance between the long cut portions is less than 1.65 millimeters.

3. A web of tags as defined in claim 1, wherein the distance between the long cut portions is less than 1.65 millimeters and the distance between the short cut portion and the first-mentioned flap portion is greater than 1.91 millimeters.

* * * * *